US006368743B1

(12) United States Patent
Guerin et al.

(10) Patent No.: US 6,368,743 B1
(45) Date of Patent: Apr. 9, 2002

(54) COMPACT BATTERY PACKAGE

(75) Inventors: John T. Guerin, Monrovia; John Ingram, Azusa, both of CA (US); Morgan Rey Benson, Indianapolis; Brad T. Hanauer, Muncie, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/519,807

(22) Filed: Mar. 6, 2000

(30) Foreign Application Priority Data

Jun. 4, 1999 (GB) ................................................ 9912900

(51) Int. Cl.⁷ ................................................ H01M 2/00
(52) U.S. Cl. ...................................... 429/159; 429/176
(58) Field of Search ................................. 429/122, 123, 429/124, 149, 150, 153, 157, 158, 159, 160, 161, 176

(56) References Cited

U.S. PATENT DOCUMENTS

| 4,407,911 A | * | 10/1983 | Hooke | ......................... | 429/94 |
| 4,547,438 A | * | 10/1985 | McArthur et al. | ............. | 429/82 |
| 5,096,788 A | * | 3/1992 | Bresin et al. | .................. | 429/99 |
| 5,929,600 A | * | 7/1999 | Hasegawa | ................... | 320/112 |
| 6,228,528 B1 | * | 5/2001 | Burkholder et al. | ......... | 429/163 |

* cited by examiner

Primary Examiner—Stephen Kalafut
Assistant Examiner—Monique Wills
(74) Attorney, Agent, or Firm—Margaret A. Dobrowitsky

(57) ABSTRACT

Described is a battery package (10) comprising: A housing (12) in which a plurality of batteries (18) are assembled, wherein each battery has a front side and a back side (22);

aligned to fit into receptacles (16, 30) therefor, a blade (20), located on the front and back sides (22) of the batteries; and a printed circuit board (14, 24) at the front and back side of the batteries, each board having receptacles (16,30) for receiving the edge of the blades (20) of the batteries and for electrically connecting the batteries within the housing and providing mechanical support for the batteries.

5 Claims, 1 Drawing Sheet

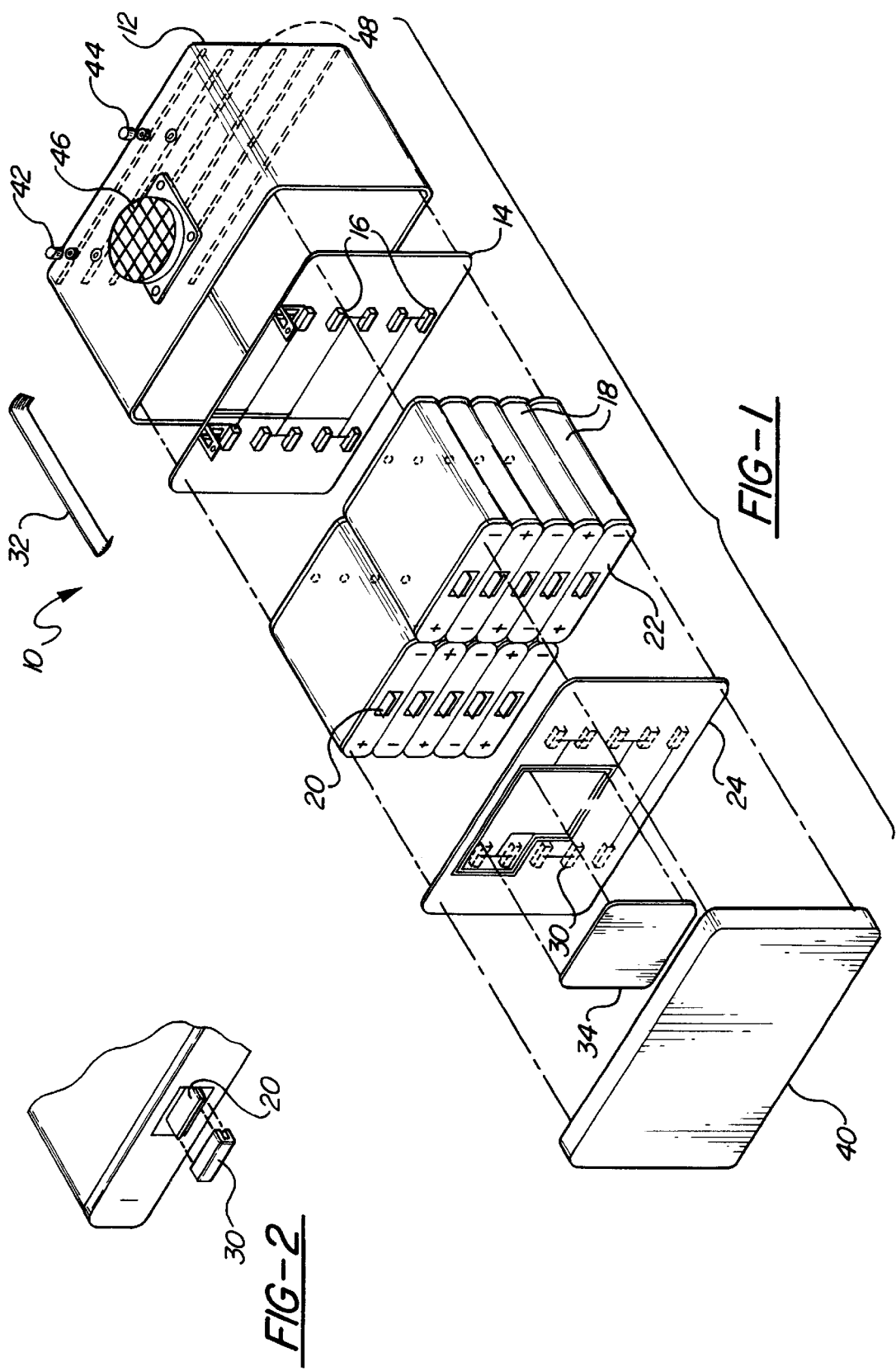

COMPACT BATTERY PACKAGE

TECHNICAL FIELD

The present invention is concerned with the need for arranging and holding a plurality of batteries and an assembled package for use in a vehicle environment. Due to the nature of a vehicle environment, the battery will be subjected to substantial vibration. Accordingly a compact battery package containing mechanical and electrical connections is desired.

BACKGROUND OF THE INVENTION

Batteries that are used in vehicles frequently are connected to cables with ring terminals. In addition, bus bars for batteries are bolted together. Such arrangements are subjected to failure due to the vibration in an automotive environment. Further, batteries have been connected with wiring harnesses and likewise are enclosed for mechanical support. Many of these arrangements are undesirable due to the vibration factor in an automotive environment.

It is an object of the present invention to provide a battery package wherein the batteries are held together in a housing where the battery has a blade shaped member which can be inserted into a receptor. The combination of a rectangular shaped blade into a receptor provides a unique connection for mechanical support and electric power interface in a compact battery package.

SUMMARY OF THE INVENTION

Described is a battery package comprising:

a housing in which a plurality of batteries are assembled, wherein each battery has a front side and a back side;

aligned to fit into receptacles therefor, a blade, located on the front and back sides of the batteries; and a printed circuit board at the front and back side of the batteries, each board having receptacles for receiving the edge of the blades of the batteries and for electrically connecting the batteries within the housing and providing mechanical support for the batteries.

BRIEF DESCRIPTION OF THE DRAWINGS

FIG. 1 is an exploded and perspective view of the battery package of the present invention.

FIG. 2 is an exploded view of the blade for holding the battery tightly in the receptacles.

DESCRIPTION OF PREFERRED EMBODIMENTS

FIG. 1 shows the compact battery package (10) with a housing (12). Inside of the housing is a printed circuit board (14) with receptacles (16). A plurality of batteries (18) have a rectangular blade (20) on a first and second side of the batteries. One side of the batteries faces the printed circuit board 14 while the second or opposite side of the battery (22) faces a second printed circuit board (24) as shown in the drawing. Adjacent and aligned with the blades (20) of the batteries (18) is a second printed circuit board (PCB) (24). The printed circuit board has aligned receptacles (30). A ribbon cable (32) connects the two printed circuit boards (14, 24). Alternatively and preferably the cable could be replaced with a flex circuit. By flex circuit is meant a flexible substrate which has the desired circuitry placed on it. In this application, it would perform a function similar to the cable 32. If desired, an electronic battery controller 34 is installed into the PCB. The controller (34) facilitates controlling the battery functions (34) and is placed within the printed circuit board (24) and is electrically connected thereto. To secure the battery package into the housing and for air distribution, a plenum side cover (40) is placed next to printed circuit board (24).

Battery terminals (42, 44) may be conveniently placed in the housing (12). To facilitate the movement of air in the housing, a vent port (46) is placed in the housing. Appropriate air circulation channels are placed in the housing and are shown as troughs (48) in the housing (12).

It is to be appreciated that the housing should be comprised of any material of such as a plastic as polyethylene or polypropylene or ABS, and the like.

By utilization of the word "blade" is meant that the blade as shown in the drawing preferably is a rectangle or blade shaped. While the exploded view of the blade 20 and that of the receptacle (30) is to be approximately equal in length, it is to be appreciated, that a receptacle could easily be larger in length than the blade. For ease of assembly of the batteries, the blade need only align with a substantial portion of the receptacle (30). In addition, the size of the blade and the size of the receptacle should be such as to facilitate appropriate electrical connection among the members of the package namely the printed circuit boards and the batteries with their respective blades. Also, the receptacle may have flexible spring electrical contacts to tolerate minor misalignment and variations in part dimensions.

The blades should be sized to provide proper mechanical support to the individual batteries. Alternatively, separate mounting features could be incorporated into the cell ends which would mate to mounts attached directly to the circuit boards.

While the drawing shows the preferred embodiments of the design of separate printed circuit boards, it is to be appreciated that the receptacles could easily be placed into the interior of the housing. In this fashion, the cells could be assembled from an opened side of the housing (12).

While of the drawing depicts a two by five arrangement of the battery cells, it is to be appreciated that any number of cells, whether they be more or less than that shown in the drawing, could be utilized. It should also be appreciated that the voltage of the combined batteries could be any multiple depending upon the desired voltage of the batteries. The preferred embodiments would be 288 volts or higher or even lower as desired as 12 or 24 or 36 or 42 volts, and the like.

This invention is especially applicable to advanced battery technologies such as lithium polymer, lithium ion, nickel metal hydride and the like.

One advantage of the compact battery assembly is the ease of assembly into desirable trains or packs with no tools. Another is a flexible orientation of the cells without customization of the cell. The battery package permits high current density as well as low resistance. The battery pack of the invention reduces the tolerance stack up and accommodates minor misalignment of the cells and variations in part dimensions. As has been discussed above in terms of a voltage, there could be an improved size of the cells for desired current levels. The battery package can be prepared at low cost. As can be seen the blade or edge of the blade connector is surface mountable onto an electronic board. The connector or blade can be aligned to provide a positive rejection feature. As can be seen there are no fasteners holding the batteries together such as nuts and bolts nor any cables mechanically holding the battery package together.

It is to be appreciated that the compact battery package is designed for high current (greater than 40 amps) and high voltage (greater than 12 volts). Due to this need of high amperage and voltage, blade shaped connectors are desired. Pin shaped connectors would be undesirable due to their inability to adequately convey the electricity and their difficulty in maintaining a good mechanical, safe connection.

While the forms of the invention herein disclosed constitute presently preferred embodiments, many others are possible. It is not intended herein to mention all of the possible equivalent forms or ramifications of the invention. It is understood that the terms used herein are merely descriptive, rather than limiting, and that various changes may be made without departing from the spirit or scope of the invention.

What is claimed is:

1. A battery package comprising:

a housing in which a plurality of batteries are assembled, wherein each battery has a front side and a back side;

aligned to fit into receptacles therefor, a blade, located on the front and back sides of the batteries; and a printed circuit board at the front and back side of the batteries, each board having receptacles for receiving the edge of the blades of the batteries and for electrically connecting the batteries within the housing and providing mechanical support for the batteries wherein the blades of the batteries provide an electrical connection with the receptacles on the printed circuit boards.

2. The battery package of claim 1 wherein the housing is adapted to have battery terminals electrically connected with the batteries.

3. The battery package of claim 1 wherein the housing has a venting port for passage of gas therethrough and a plenum to distribute the air within the package.

4. The battery package of claim 1 wherein electrically aligned with the circuit board attached to the front side of the battery is an electronic battery controller.

5. The battery package of claim 1 wherein a side cover for the housing snugly fits the printed circuit boards and the batteries within the housing.

* * * * *